United States Patent
Klinefelter et al.

(10) Patent No.: US 7,399,131 B2
(45) Date of Patent: *Jul. 15, 2008

(54) METHOD AND DEVICE FOR FORMING AN INK-RECEPTIVE CARD SUBSTRATE

(75) Inventors: Gary M. Klinefelter, Eden Prairie, MN (US); Karl A. Karst, Woodbury, MN (US)

(73) Assignee: Fargo Electronics, Inc., Eden Prairie, MN (US)

( * ) Notice: Subject to any disclaimer, the term of this patent is extended or adjusted under 35 U.S.C. 154(b) by 49 days.

This patent is subject to a terminal disclaimer.

(21) Appl. No.: 11/293,966

(22) Filed: Dec. 5, 2005

(65) Prior Publication Data

US 2006/0070545 A1    Apr. 6, 2006

Related U.S. Application Data

(63) Continuation-in-part of application No. 10/717,800, filed on Nov. 20, 2003, now Pat. No. 7,037,013, which is a continuation-in-part of application No. 09/799,196, filed on Mar. 5, 2001, now abandoned, application No. 11/293,966, which is a continuation of application No. 10/865,521, filed on Jun. 10, 2004, now Pat. No. 6,979,141, which is a continuation-in-part of application No. 10/717,800, filed on Nov. 20, 2003, now Pat. No. 7,037,013, which is a continuation-in-part of application No. 09/799,196, filed on Mar. 5, 2001, now abandoned.

(51) Int. Cl.
  *B41J 2/01* (2006.01)
  *B32B 38/18* (2006.01)
  *B32B 38/14* (2006.01)
  *B42D 15/10* (2006.01)

(52) U.S. Cl. ..................... 400/521; 347/212

(58) Field of Classification Search ................ None
See application file for complete search history.

(56) References Cited

U.S. PATENT DOCUMENTS 3,193,430 A    7/1965    Messmer et al. ........ 156/521 X (Continued)

FOREIGN PATENT DOCUMENTS

DE    2535699 A1    3/1977

(Continued)

OTHER PUBLICATIONS

Office Action dated Nov. 5, 2003 for U.S. Appl. No. 09/799,196.

(Continued)

*Primary Examiner*—Daniel J Colilla
(74) *Attorney, Agent, or Firm*—Leanne Taveggia Farrell; Westman, Champlin & Kelly, P.A.

(57) ABSTRACT

In a method of forming an ink-receptive card substrate, an ink-receptive material is provided. The ink-receptive material includes a backing layer and an ink-receptive coating on a surface of the backing layer. Next, a card member is provided. Finally, the ink-receptive material is laminated to a surface of the card member with the ink-receptive coating facing the surface of the card member. This results in the bonding of the ink-receptive coating to the surface of the card member. Additional embodiments of the present invention are directed to devices that are configured to perform the above-identified method.

19 Claims, 7 Drawing Sheets

U.S. PATENT DOCUMENTS

| | | | |
|---|---|---|---|
| 3,434,902 A | 3/1969 | Bliss | 156/230 |
| 3,446,415 A | 5/1969 | Bromley | |
| 3,713,939 A | 1/1973 | Preg | 156/248 |
| 3,761,079 A | 9/1973 | Azure, Jr. | |
| 3,857,527 A | 12/1974 | Kranz | 242/75.5 |
| 3,879,246 A | 4/1975 | Walker | 156/265 |
| 3,887,106 A | 6/1975 | Charlson et al. | |
| 3,889,472 A | 6/1975 | Guillaud | |
| 3,922,435 A | 11/1975 | Asnes | 428/349 |
| 3,960,072 A | 6/1976 | Ahlgren et al. | |
| 4,006,050 A | 2/1977 | Hurst et al. | 101/369 |
| 4,021,032 A | 5/1977 | Gross et al. | |
| 4,032,135 A | 6/1977 | Ruenzi | 271/116 |
| 4,068,028 A | 1/1978 | Samonides | |
| 4,146,900 A | 3/1979 | Arnold | |
| 4,179,732 A | 12/1979 | Khan et al. | |
| 4,224,358 A | 9/1980 | Hare | 427/147 |
| 4,235,657 A | 11/1980 | Greenman et al. | 156/234 |
| 4,282,583 A | 8/1981 | Khan et al. | |
| 4,300,974 A | 11/1981 | Bauer | 156/360 |
| 4,313,683 A | 2/1982 | Brown et al. | |
| 4,393,386 A | 7/1983 | Di Guilio | |
| 4,399,209 A | 8/1983 | Sanders et al. | 430/138 |
| 4,457,964 A | 7/1984 | Kaminstein | 428/43 |
| 4,471,885 A | 9/1984 | Mucciarone | |
| 4,474,850 A | 10/1984 | Burwasser | 428/336 |
| 4,528,242 A | 7/1985 | Burwasser | 428/413 |
| 4,534,313 A | 8/1985 | Louvel | |
| 4,548,857 A | 10/1985 | Galante | 428/200 |
| 4,555,437 A | 11/1985 | Tanck | 428/212 |
| 4,568,403 A | 2/1986 | Egan | 156/247 |
| 4,575,465 A | 3/1986 | Viola | 427/261 |
| 4,578,285 A | 3/1986 | Viola | 427/209 |
| 4,592,954 A | 6/1986 | Malhotra | 428/335 |
| 4,604,631 A | 8/1986 | Jinnai et al. | |
| 4,617,080 A | 10/1986 | Kobayashi et al. | 156/359 |
| 4,650,714 A | 3/1987 | Kojima et al. | 428/341 |
| 4,680,235 A | 7/1987 | Murakami et al. | 428/414.4 |
| 4,680,596 A | 7/1987 | Logan | |
| 4,685,702 A | 8/1987 | Kazuharu | |
| 4,686,540 A | 8/1987 | Leslie et al. | |
| 4,716,346 A | 12/1987 | Matsuo | |
| 4,719,626 A | 1/1988 | Ogasawara | |
| 4,732,786 A | 3/1988 | Patterson et al. | 427/261 |
| 4,734,868 A | 3/1988 | DeLacy | |
| 4,750,743 A | 6/1988 | Nicoletti | |
| 4,758,461 A | 7/1988 | Akiya et al. | 428/212 |
| 4,758,952 A | 7/1988 | Harris, Jr. et al. | 364/300 |
| 4,770,934 A | 9/1988 | Yamasaki et al. | 428/331 |
| 4,781,985 A | 11/1988 | Desjarlais | |
| 4,830,911 A | 5/1989 | Kojima et al. | 428/342 |
| 4,839,200 A | 6/1989 | Hoffman et al. | 427/265 |
| 4,868,581 A | 9/1989 | Mauri et al. | 346/1.1 |
| 4,877,678 A | 10/1989 | Hasegawa et al. | 428/216 |
| 4,877,686 A | 10/1989 | Riou et al. | 428/514 |
| 4,877,688 A | 10/1989 | Senoo et al. | 428/522 |
| 4,897,533 A | 1/1990 | Lyszczarz | 235/487 |
| 4,900,620 A | 2/1990 | Tokita et al. | 428/330 |
| 4,910,084 A | 3/1990 | Yamasaki et al. | 428/411.1 |
| 4,926,190 A | 5/1990 | Laver | 346/1.1 |
| 4,938,830 A | 7/1990 | Cannistra | 156/270 |
| 4,944,988 A | 7/1990 | Yasuda et al. | 428/195 |
| 4,961,088 A | 10/1990 | Gilliland et al. | |
| 4,966,815 A | 10/1990 | Hare | 428/497 |
| 4,980,224 A | 12/1990 | Hare | 428/202 |
| 5,006,407 A | 4/1991 | Malhotra | 428/336 |
| 5,018,614 A | 5/1991 | Ruckert | |
| 5,019,475 A | 5/1991 | Higashiyama et al. | 430/138 |
| 5,027,135 A | 6/1991 | Negishi et al. | |
| 5,028,028 A | 7/1991 | Yamada et al. | 248/430 |
| 5,041,328 A | 8/1991 | Akiya et al. | 428/212 |
| 5,073,448 A | 12/1991 | Vieira et al. | 428/331 |
| 5,079,901 A | 1/1992 | Kotsiopoulos | 225/4 X |
| 5,084,340 A | 1/1992 | Light | 428/327 |
| 5,096,781 A | 3/1992 | Vieira et al. | 428/411.1 |
| 5,101,218 A | 3/1992 | Sakaki et al. | 346/1.1 |
| 5,110,389 A | 5/1992 | Hiyoshi et al. | 156/234 |
| 5,118,570 A | 6/1992 | Malhotra | 428/474.4 |
| 5,120,601 A | 6/1992 | Kotaki et al. | 428/327 |
| 5,124,201 A | 6/1992 | Kurabayashi et al. | 428/323 |
| 5,126,193 A | 6/1992 | Light | 428/327 |
| 5,126,194 A | 6/1992 | Light | 428/327 |
| 5,137,778 A | 8/1992 | Nakatsugawa et al. | 428/330 |
| 5,139,867 A | 8/1992 | Light | 428/327 |
| 5,139,868 A | 8/1992 | Mori et al. | 428/327 |
| 5,139,917 A | 8/1992 | Hare | 430/138 |
| 5,141,797 A | 8/1992 | Wheeler | 428/195 |
| 5,161,233 A | 11/1992 | Matsuo et al. | |
| 5,165,973 A | 11/1992 | Kojima et al. | 428/331 |
| 5,171,626 A | 12/1992 | Nagamine et al. | 428/212 |
| 5,180,624 A | 1/1993 | Kojima et al. | 428/211 |
| 5,184,181 A | 2/1993 | Kurando et al. | |
| 5,185,213 A | 2/1993 | Fujita et al. | 428/500 |
| 5,190,234 A | 3/1993 | Ezekiel | 156/502 |
| 5,190,805 A | 3/1993 | Atherton et al. | 428/195 |
| 5,194,317 A | 3/1993 | Sato et al. | 428/195 |
| 5,206,071 A | 4/1993 | Atherton et al. | 428/195 |
| 5,208,092 A | 5/1993 | Iqbal | 428/195 |
| 5,213,873 A | 5/1993 | Yasuda et al. | 428/195 |
| 5,236,801 A | 8/1993 | Hare | 430/199 |
| 5,238,524 A | 8/1993 | Seki et al. | 156/538 |
| 5,241,328 A | 8/1993 | Sarraf et al. | 347/232 |
| 5,246,774 A | 9/1993 | Sakaki et al. | 428/323 |
| 5,252,531 A | 10/1993 | Yasuda et al. | 503/227 |
| 5,266,383 A | 11/1993 | Sakaki et al. | 428/195 |
| 5,266,968 A | 11/1993 | Stephenson | |
| 5,267,800 A | 12/1993 | Petteruti et al. | |
| 5,271,990 A | 12/1993 | Kronzer et al. | 428/195 |
| 5,277,501 A | 1/1994 | Tanaka et al. | 400/120 |
| 5,277,734 A | 1/1994 | Bayer | 156/230 |
| 5,277,962 A | 1/1994 | Nakatsugawa et al. | 428/206 |
| 5,281,467 A | 1/1994 | Shimada et al. | 428/195 |
| 5,290,067 A | 3/1994 | Langen | 283/60.1 |
| 5,302,436 A | 4/1994 | Miller | 428/195 |
| 5,302,437 A | 4/1994 | Idei et al. | 428/195 |
| 5,318,369 A | 6/1994 | Ishii | |
| 5,318,370 A | 6/1994 | Nehowig | |
| 5,320,897 A | 6/1994 | Kondo et al. | 428/195 |
| 5,326,179 A | 7/1994 | Fukai et al. | |
| 5,327,201 A | 7/1994 | Coleman et al. | |
| 5,328,748 A | 7/1994 | Westfal | 428/195 |
| 5,334,439 A | 8/1994 | Kawaguchi et al. | 428/212 |
| 5,338,597 A | 8/1994 | Kurabayashi et al. | 428/195 |
| 5,352,503 A | 10/1994 | Drake et al. | 428/195 |
| 5,354,401 A | 10/1994 | Asahi et al. | |
| 5,362,558 A | 11/1994 | Sakaki et al. | 428/323 |
| 5,362,703 A | 11/1994 | Kawasaki et al. | 503/227 |
| 5,364,702 A | 11/1994 | Idei et al. | 428/423.1 |
| 5,368,677 A | 11/1994 | Ueda et al. | |
| 5,372,884 A | 12/1994 | Abe et al. | 428/331 |
| 5,373,146 A | 12/1994 | Lei | |
| 5,378,884 A | 1/1995 | Lundstrom et al. | |
| 5,407,724 A | 4/1995 | Mimura et al. | 428/141 |
| 5,410,642 A | 4/1995 | Hakamatsuka et al. | |
| 5,412,779 A | 5/1995 | Motoyama | |
| 5,413,532 A | 5/1995 | Raby | |
| 5,431,501 A | 7/1995 | Hale et al. | 400/120.02 |
| 5,437,960 A | 8/1995 | Nagate et al. | 430/256 |
| 5,441,921 A | 8/1995 | Verdonck et al. | |
| 5,447,566 A | 9/1995 | Loiacond | 101/228 |
| 5,448,282 A | 9/1995 | Imai et al. | |
| 5,455,611 A | 10/1995 | Simon et al. | |
| 5,466,319 A | 11/1995 | Zager et al. | |
| 5,484,215 A | 1/1996 | Fillod et al. | 400/120.18 |

| Patent No. | Date | Inventor | Class |
|---|---|---|---|
| 5,484,502 A | 1/1996 | Bozanic | 156/235 |
| 5,489,567 A | 2/1996 | Koshizuka et al. | |
| 5,503,702 A | 4/1996 | Filicicchia et al. | 156/249 |
| 5,516,218 A | 5/1996 | Amano et al. | |
| 5,532,724 A | 7/1996 | Inagaki et al. | 347/213 |
| 5,537,554 A | 7/1996 | Motoyama | |
| 5,544,289 A | 8/1996 | Motoyama | |
| 5,549,774 A | 8/1996 | Miekka et al. | 156/209 |
| 5,550,735 A | 8/1996 | Slade et al. | |
| 5,550,984 A | 8/1996 | Gelb | |
| 5,552,994 A | 9/1996 | Cannon et al. | |
| 5,558,449 A | 9/1996 | Morgavi | |
| 5,568,618 A | 10/1996 | Motoyama | |
| 5,573,621 A | 11/1996 | Boreali | 156/256 |
| 5,614,058 A | 3/1997 | Didelot et al. | 156/542 |
| 5,623,001 A | 4/1997 | Figer | 106/31.43 |
| 5,626,699 A | 5/1997 | Didelot et al. | 156/99 |
| 5,630,581 A | 5/1997 | Rodesch | |
| 5,634,731 A | 6/1997 | Kita et al. | |
| 5,637,174 A | 6/1997 | Field et al. | 156/256 |
| 5,646,388 A | 7/1997 | D'Entremont et al. | |
| 5,647,938 A | 7/1997 | Levine | 156/269 |
| 5,649,120 A | 7/1997 | Motoyama | |
| 5,673,076 A | 9/1997 | Nardone et al. | 347/171 |
| 5,695,589 A | 12/1997 | German et al. | |
| 5,697,297 A | 12/1997 | Rasmussen | 101/211 |
| 5,700,537 A | 12/1997 | Instance | 156/253 |
| 5,706,042 A | 1/1998 | Takeyama et al. | 347/100 |
| 5,707,925 A | 1/1998 | Akada et al. | 503/227 |
| 5,709,484 A | 1/1998 | Dorner | |
| 5,709,485 A | 1/1998 | Kohno | |
| 5,715,381 A | 2/1998 | Hamilton | |
| 5,717,776 A | 2/1998 | Watanabe | |
| 5,727,137 A | 3/1998 | LeClair et al. | |
| 5,729,817 A | 3/1998 | Raymond et al. | 400/635 |
| 5,735,994 A | 4/1998 | Lappe et al. | 156/386 |
| 5,745,036 A | 4/1998 | Clare | |
| 5,758,184 A | 5/1998 | Lucovsky et al. | |
| 5,765,481 A | 6/1998 | Tortora et al. | 101/211 |
| 5,768,143 A | 6/1998 | Fujimoto | |
| 5,768,483 A | 6/1998 | Maniwa et al. | |
| 5,768,495 A | 6/1998 | Campbell et al. | |
| 5,769,408 A | 6/1998 | Selak et al. | 271/10.03 |
| 5,770,268 A | 6/1998 | Kuo et al. | 427/386 |
| 5,771,058 A | 6/1998 | Kobayashi | |
| 5,771,071 A | 6/1998 | Bradley et al. | |
| 5,771,382 A | 6/1998 | Wang et al. | |
| 5,773,188 A | 6/1998 | Ellis | 430/201 |
| 5,774,678 A | 6/1998 | Motoyama | |
| 5,783,024 A | 7/1998 | Korkert | 156/351 |
| 5,785,224 A | 7/1998 | Nowakowski | 225/4 |
| 5,790,162 A | 8/1998 | Adams et al. | |
| 5,790,924 A | 8/1998 | Creutzmann et al. | 399/110 |
| 5,796,420 A | 8/1998 | Kaerts et al. | |
| 5,798,161 A | 8/1998 | Kita et al. | 428/64.1 |
| 5,805,810 A | 9/1998 | Maxwell | |
| 5,807,461 A | 9/1998 | Hagstrom | 156/361 |
| 5,814,796 A | 9/1998 | Benson et al. | 235/375 |
| 5,819,110 A | 10/1998 | Motoyama | |
| 5,820,277 A | 10/1998 | Schulte | 400/223 |
| 5,822,534 A | 10/1998 | Yamunachari et al. | |
| 5,825,392 A | 10/1998 | Mochizuki | 347/197 |
| 5,828,567 A | 10/1998 | Eryurek et al. | |
| 5,835,911 A | 11/1998 | Nakagawa et al. | |
| 5,837,991 A | 11/1998 | LaManna et al. | |
| 5,850,248 A | 12/1998 | Bellemore | 347/262 |
| 5,860,068 A | 1/1999 | Cook | |
| 5,861,355 A | 1/1999 | Olson et al. | 503/201 |
| 5,862,260 A | 1/1999 | Rhoads | |
| 5,873,606 A | 2/1999 | Haas et al. | 283/75 |
| 5,874,145 A | 2/1999 | Waller | 428/42.1 |
| 5,884,014 A | 3/1999 | Huttenlocher et al. | |
| 5,886,334 A | 3/1999 | D'Entremont et al. | |
| 5,887,216 A | 3/1999 | Motoyama | |
| 5,889,866 A | 3/1999 | Cyras et al. | |
| 5,936,542 A | 8/1999 | Kleinrock et al. | |
| 5,941,414 A | 8/1999 | Kasper | |
| 5,941,522 A | 8/1999 | Hagstrom et al. | 271/225 |
| 5,942,335 A | 8/1999 | Chen et al. | 428/500 |
| 5,944,945 A | 8/1999 | Shinohe et al. | |
| 5,962,832 A | 10/1999 | Dorner | |
| 5,973,692 A | 10/1999 | Knowlton et al. | |
| 5,980,011 A | 11/1999 | Cummins et al. | 347/4 |
| 5,981,045 A | 11/1999 | Kuwabara et al. | 428/212 |
| 5,981,077 A | 11/1999 | Taniguchi | 428/447 |
| 5,999,908 A | 12/1999 | Abelow | |
| 6,001,209 A | 12/1999 | Popat et al. | 156/249 |
| 6,001,771 A | 12/1999 | Nakano et al. | 503/227 |
| 6,017,031 A | 1/2000 | Oosawa et al. | 271/121 |
| 6,022,429 A | 2/2000 | Hagstrom | |
| 6,033,832 A | 3/2000 | Wingender | |
| 6,051,306 A | 4/2000 | Paulson | 428/195 |
| 6,054,223 A | 4/2000 | Tsuchiya et al. | 428/478.2 |
| 6,066,387 A | 5/2000 | Ueda et al. | 428/212 |
| 6,070,146 A | 5/2000 | Mimata | |
| 6,071,368 A | 6/2000 | Boyd et al. | 156/240 |
| 6,096,396 A | 8/2000 | Patton et al. | 428/40.1 |
| 6,100,804 A | 8/2000 | Brady et al. | |
| 6,103,042 A | 8/2000 | Hatada et al. | 156/235 |
| 6,108,020 A | 8/2000 | Oshima | 347/214 |
| 6,136,129 A | 10/2000 | Petkovsek | 456/247 |
| 6,152,038 A | 11/2000 | Wagner et al. | 101/488 |
| 6,159,570 A | 12/2000 | Ulrich et al. | 428/40.1 |
| 6,174,404 B1 | 1/2001 | Klinger | 156/272.2 |
| 6,182,136 B1 | 1/2001 | Ramanathan et al. | |
| 6,189,103 B1 | 2/2001 | Nevarez et al. | |
| 6,196,459 B1 | 3/2001 | Goman et al. | |
| 6,199,753 B1 | 3/2001 | Tracy et al. | |
| 6,219,669 B1 | 4/2001 | Haff et al. | |
| 6,220,511 B1 | 4/2001 | Holec et al. | |
| 6,233,683 B1 | 5/2001 | Chan et al. | |
| 6,241,332 B1 | 6/2001 | Cummins et al. | 347/4 |
| 6,245,479 B1 | 6/2001 | Etzel | 428/195 |
| 6,261,012 B1 | 7/2001 | Haas et al. | 156/265 |
| 6,270,072 B1 | 8/2001 | Louie | 270/157 |
| 6,270,858 B1 | 8/2001 | Paulson | 427/508 |
| 6,272,472 B1 | 8/2001 | Danneels et al. | |
| 6,283,188 B1 | 9/2001 | Maynard et al. | 156/351 |
| 6,292,092 B1 | 9/2001 | Chow et al. | |
| 6,296,032 B1 | 10/2001 | Louie et al. | 156/387 |
| 6,298,336 B1 | 10/2001 | Davis et al. | |
| 6,299,967 B1 | 10/2001 | Collins et al. | 428/211 |
| 6,335,799 B1 | 1/2002 | Provost | |
| 6,368,684 B1 | 4/2002 | Onishi et al. | 428/29 |
| 6,380,965 B1 | 4/2002 | Sims et al. | |
| 6,386,772 B1 | 5/2002 | Klinefelter et al. | |
| 6,409,872 B1 | 6/2002 | Campion et al. | 456/264 |
| 6,412,991 B1 | 7/2002 | Klinefelter et al. | |
| 6,428,132 B1 | 8/2002 | Kubatzki et al. | |
| 6,489,266 B1 | 12/2002 | Kurokawa et al. | 503/227 |
| 6,497,781 B1 | 12/2002 | Dalvey et al. | 156/234 |
| 6,554,512 B2 | 4/2003 | Heno et al. | |
| 6,565,204 B2 | 5/2003 | Matsuhashi et al. | 347/103 |
| 6,576,324 B2 | 6/2003 | Yoshino et al. | |
| 6,582,141 B2 | 6/2003 | Meier et al. | |
| 6,584,290 B2 | 6/2003 | Kurz et al. | |
| 6,592,032 B1 | 7/2003 | Takaragi et al. | |
| 6,629,134 B2 | 9/2003 | Hayward et al. | |
| 6,631,967 B1 | 10/2003 | Saruta | |
| 6,640,717 B2 | 11/2003 | Kosaka et al. | 101/487 |
| 6,644,771 B1 | 11/2003 | Silverbrook | |
| 6,644,802 B2 | 11/2003 | Minowa | 347/105 |
| 6,646,666 B2 | 11/2003 | Matsuoka | 347/213 |
| 6,647,871 B2 | 11/2003 | Morand | |
| 6,650,430 B2 | 11/2003 | Francis et al. | |
| 6,663,100 B2 | 12/2003 | Crowley | |

| | | | |
|---|---|---|---|
| 6,694,884 B2 | 2/2004 | Klinefelter et al. | |
| 6,702,282 B2 | 3/2004 | Pribula et al. | |
| 6,737,139 B2 | 5/2004 | Sidney et al. | 428/43 |
| 6,758,616 B2 | 7/2004 | Pribula et al. | |
| 6,776,470 B2 | 8/2004 | Steinmetz et al. | |
| 6,788,800 B1 | 9/2004 | Carr et al. | |
| 6,796,647 B2 | 9/2004 | Kosaka et al. | |
| 6,802,586 B2 | 10/2004 | Forman | |
| 6,816,968 B1 | 11/2004 | Walmsley | |
| 6,850,901 B1 | 2/2005 | Hunter et al. | |
| 6,857,736 B2 | 2/2005 | Onishi et al. | 347/105 |
| 6,929,413 B2 | 8/2005 | Schofield | |
| 6,932,527 B2 | 8/2005 | Pribula et al. | |
| 6,963,351 B2 | 11/2005 | Squires et al. | |
| 6,979,141 B2 | 12/2005 | Karst et al. | |
| 6,997,629 B2 | 2/2006 | Bungert et al. | |
| 7,037,013 B2 | 5/2006 | Klinefelter et al. | |
| 7,076,453 B2 | 7/2006 | James et al. | |
| 7,163,153 B2 * | 1/2007 | Blossom | 235/492 |
| 2001/0018111 A1 * | 8/2001 | Sugie et al. | 428/156 |
| 2002/0012773 A1 | 1/2002 | Vaidyz et al. | 428/195 |
| 2002/0018253 A1 | 2/2002 | Toshine et al. | 359/3 |
| 2002/0048654 A1 | 4/2002 | Yoshino et al. | 428/195 |
| 2002/0072998 A1 | 6/2002 | Haines et al. | |
| 2002/0116301 A1 | 8/2002 | Chapman et al. | |
| 2002/0127042 A1 | 9/2002 | Klinefelter | 400/120.01 |
| 2002/0180993 A1 | 12/2002 | Klinefelter et al. | |
| 2003/0000637 A1 | 1/2003 | Campion et al. | 156/264 |
| 2003/0028766 A1 | 2/2003 | Gass et al. | |
| 2003/0046171 A1 | 3/2003 | Whale | |
| 2003/0059050 A1 | 3/2003 | Hohberger et al. | |
| 2003/0059565 A1 | 3/2003 | Otaki et al. | 428/40.1 |
| 2003/0090712 A1 | 5/2003 | Lenz | |
| 2003/0139973 A1 | 7/2003 | Claremont et al. | |
| 2003/0182587 A1 | 9/2003 | Morrison et al. | |
| 2003/0213550 A1 | 11/2003 | Daems et al. | 156/250 |
| 2003/0216826 A1 | 11/2003 | Klinefelter et al. | |
| 2004/0101340 A1 | 5/2004 | Klinefelter et al. | 400/120.01 |
| 2004/0125187 A1 | 7/2004 | Kosaka et al. | 347/102 |
| 2004/0135241 A1 | 7/2004 | Conner et al. | 257/679 |
| 2004/0146329 A1 | 7/2004 | Klinefelter | 400/120.01 |
| 2004/0161555 A1 | 8/2004 | Niu et al. | 428/32.1 |
| 2004/0223011 A1 | 11/2004 | Adkins et al. | |
| 2004/0224103 A1 | 11/2004 | Karst et al. | 428/32.12 |
| 2005/0060239 A1 | 3/2005 | Holland | |
| 2005/0236473 A1 * | 10/2005 | Lenz et al. | 235/380 |
| 2006/0122912 A1 | 6/2006 | Holland | |

FOREIGN PATENT DOCUMENTS

| | | |
|---|---|---|
| DE | 19644306 A1 | 5/1998 |
| EP | 0195104 A1 | 9/1986 |
| EP | 0 278 517 A2 | 2/1988 |
| EP | 0 442 762 | 8/1991 |
| EP | 3-234670 | 10/1991 |
| EP | 0562979 A2 | 9/1993 |
| EP | 0562979 A3 | 9/1993 |
| EP | 0597135 A1 | 5/1994 |
| EP | 0659588 A2 | 6/1995 |
| EP | 8-66999 | 3/1996 |
| EP | 0887197 A2 | 12/1998 |
| EP | 0924597 A2 | 6/1999 |
| EP | 0887197 A3 | 5/2000 |
| EP | 1 013 466 A2 | 6/2000 |
| FR | 2667416 | 4/1992 |
| GB | 2120821 A | 12/1983 |
| JP | 407314882 A | 5/1995 |
| JP | 09300675 | 11/1997 |
| JP | 11034545 A | 2/1999 |
| JP | 2870574 | 3/1999 |
| JP | 11 219116 A | 10/1999 |
| JP | 2002307874 | 10/2002 |
| WO | 8607480 | 12/1986 |
| WO | 95/09084 | 4/1995 |
| WO | 96/39656 | 12/1996 |
| WO | WO 98/16394 | 4/1998 |
| WO | WO 98/24632 | 6/1998 |
| WO | 98/51508 | 11/1998 |
| WO | WO 98/52762 | 11/1998 |
| WO | WO 99/04080 | 1/1999 |
| WO | 99/21713 | 5/1999 |
| WO | 99/49379 | 9/1999 |
| WO | 00/43932 | 7/2000 |
| WO | 2003/019459 A3 | 3/2003 |
| WO | 03/059632 A1 | 7/2003 |
| WO | 03/060811 A2 | 7/2003 |
| WO | 03/079168 A2 | 9/2003 |
| WO | 2004/011268 A1 | 2/2004 |

OTHER PUBLICATIONS

Ando et al., Machine Translation of 2002307874 from Japanese Patent Office website, Oct. 2002.
Hashiba et al., Machine Translation of 09300675 from Japanese Patent Office website, Nov. 1997.
Office Communication for U.S. Appl. No. 10/865,521, filed Jun. 10, 2004; date of mailing: Feb. 22, 2005.
Office Communication for U.S. Appl. No. 10/757,823, filed Jan. 15, 2004 with a mailing date of Sep. 7, 2004.
Machine Translation of JP 11034545 to Shindou et al. from Japanese Patent Office website, Feb. 1999.
U.S. Appl. No. 09/799,196, filed Mar. 5, 2001 entitled "Printer With Reverse Image Sheet".
Notification of Transmittal of the International Search Report and Written Opinion of the International Searching Authority in counterpart foreign application PCT/US04/00778, no date available.
Notification of Transmittal of the International Search Report and the Written Opinion of the International Searching Authority, or the Declaration from PCT/US04/18537, no date available.
Written Opinion of the International Searching Authority from PCT/US04/18537, no date available.
U.S. Appl. No. 60/478,490, filed Jun. 13, 2003.
U.S. Appl. No. 60/493,129, filed Aug. 7, 2003.
Notification of Transmittal of the International Search Report dated Oct. 26, 2005 for International Application No. PCT/US04/29429, filed Sep. 9, 2004.
Written Opinion of the International Searching Authority dated Oct. 26, 2005 for International Application No. PCT/US04/29429, filed Sep. 9, 2004.
"OrdaCard announces new Internet based high volume secured photo ID card production services", Business Wire, Inc., pp. 1-2, Oct. 1998.
"Card Printing Service", www.SmardIDCard.com, pp. 1-4, Jul. 2002.
"Smart ID Card - Card Printing Services, ID Cards, Card Supplies, Smart Card Solutions", www.SmardIDCard.com, pp. 1-5, Jul. 2002.
UbiQ Smart Card Software Makes New Fargo Printers Complete Card-Issuance Systems Issuers Can Print and Personalize Smart Cards Using Pro Series ID Card Printers Combined with Ubiq's Personalization Software, pp. 1-2, Apr. 1998.
"DataCard Debuts Image and Data Retrieval Software for Enterprise Applications", Business Wire, Inc., p. 1-2, Apr. 1998.
Rapid Logic, Rapid Control, The Architecture for Element Management, Integrated Systems, pp. 1-4, no date available.
The Hard Copy Observer, vol. X, No. II, pp. 1, 2 and 30-33, Nov. 2000.
Color Business Report, Color Computers, and Reprographics, vol. 9, No. 4, Apr. 1999.

* cited by examiner

METHOD AND DEVICE FOR FORMING AN INK-RECEPTIVE CARD SUBSTRATE

The present application is a continuation-in-part and claims priority of U.S. patent application entitled "INK-RECEPTIVE CARD SUBSTRATE," Ser. No. 10/717,800, filed Nov. 20, 2003 which is a continuation-in-part of U.S. patent application entitled "PRINTER WITH REVERSE IMAGE SHEET," Ser. No. 09/799,196, filed Mar. 5, 2001, and the present application is a continuation of and claims priority of U.S. patent application entitled "IDENTIFICATION CARDS, PROTECTIVE COATINGS, FILMS, AND METHODS FOR FORMING THE SAME," Ser. No. 10/865,521, filed Jun. 10, 2004, which is a continuation-in-part of U.S. patent application entitled "INK-RECEPTIVE CARD SUBSTRATE," Ser. No. 10/717,800, filed Nov. 20, 2003, which is a continuation-in-part of U.S. patent application entitled "PRINTER WITH REVERSE IMAGE SHEET," Ser. No. 09/799,196, filed Mar. 5, 2001; the contents of which are hereby incorporated by reference in their entirety.

FIELD OF THE INVENTION

The present invention is related to card substrates, and more particularly, to a method and device for manufacturing card substrates having an ink-receptive coating.

BACKGROUND OF THE INVENTION

Ink jet printers are known and provide a number of advantages in the printing process. For example, ink jet printers are capable of providing relatively high density color output at an acceptable printing speed. Furthermore, such printers are relatively inexpensive. As a result, it is desirable to utilize such printers in the formation of identification cards. Unfortunately, ink from ink jet printers does not adhere well to the plastic surfaces of most identification card substrates, which are typically formed of PVC. Accordingly, it is necessary to create an ink-receptive surface on the identification card substrate to allow it to receive an image printed by an ink-jet printer.

Methods have been used to provide ink jet printable or receptive surfaces on various types of substrates, such as compact discs and identification cards. In general, these methods involve coating the surface with an ink-receptive material. Once coated with the ink-receptive material, the card substrates can be used in identification card printers utilizing ink jet printheads, such as the CardJet 410 printer and encoder manufactured by Fargo Electronics, Inc. of Eden Prairie, Minn. Examples of such ink-receptive materials encoding methods are provided in U.S. Pat. Nos. 6,051,306 and 6,270,858, which issued Apr. 18, 2000 and Aug. 7, 2001, respectively, and are both assigned to Fargo Electronics, Inc.

Ink-receptive films have also been applied to card substrates to form an ink-receptive surface thereon. As illustrated in FIG. 1, such ink-receptive films 10 are formed of a clear or an opaque backing layer (e.g., PET, PVC, etc.) 12, on which an ink-receptive coating 14 is applied. A layer of adhesive 16 is generally applied between the backing layer 12 and a surface 18 of a rigid or semi-rigid card member 20. Card member 20 is a conventional blank card substrate that is typically formed of PVC or other suitable material. A protective cover (not shown) is laid over the ink-receptive coating 14 and the backing layer 12 of the ink-receptive film 10 is laminated to card member 20 through application of heat and pressure. Portions of ink-receptive film 10 that overhang the edges of card member 20 are then trimmed as necessary. A laminate layer 22 can be laminated to a bottom surface 24 of card member 20 by adhesive layer 26 in an effort to counterbalance stresses that are applied to card member 20 as a result of the lamination of backing layer 12 of ink-receptive film 10 to surface 18 of card member 20.

Unfortunately, the above-described process of forming an ink-receptive card substrate using an ink-receptive film is problematic. The layers of adhesive, ink-receptive film, card member, and the laminate, result in a complex and expensive ink-receptive card substrate. Also, the backing layer of the ink-receptive film can potentially delaminate from the card member due to its exposed edges, thereby limiting the useful life span of the ink-receptive card substrate. Additionally, the image that is printed to the ink-receptive surface that is formed by the ink-receptive coating of the film can be easily modified by replacing the printed ink-receptive film with another. As a result, these ink-receptive card substrates are complicated, expensive to form, have a limited life span, and offer little security against alteration.

Images that are printed to ink-receptive surfaces of card substrates that are formed in accordance with the methods described above are susceptible to defacement due to abrasion, exposure to water, and other environmental conditions. Accordingly, a protective overlaminate material must be applied over the printed ink-receptive surface to protect the printed image.

SUMMARY OF THE INVENTION

The present invention is generally directed to a method of forming an ink-receptive card substrate. In the method, an ink-receptive material is provided. The ink-receptive material includes a backing layer and an ink-receptive coating on a surface of the backing layer. Next, a card member is provided. Finally, the ink-receptive material is laminated to a surface of the card member with the ink-receptive coating facing the surface of the card member. This results in the bonding of the ink-receptive coating to the surface of the card member. Additional embodiments of the present invention are directed to devices that are configured to perform the above-identified method.

Other features and benefits that characterize embodiments of the present invention will be apparent upon reading the following detailed description and review of the associated drawings.

DETAILED DESCRIPTION OF THE PREFERRED EMBODIMENTS

Figure 1:
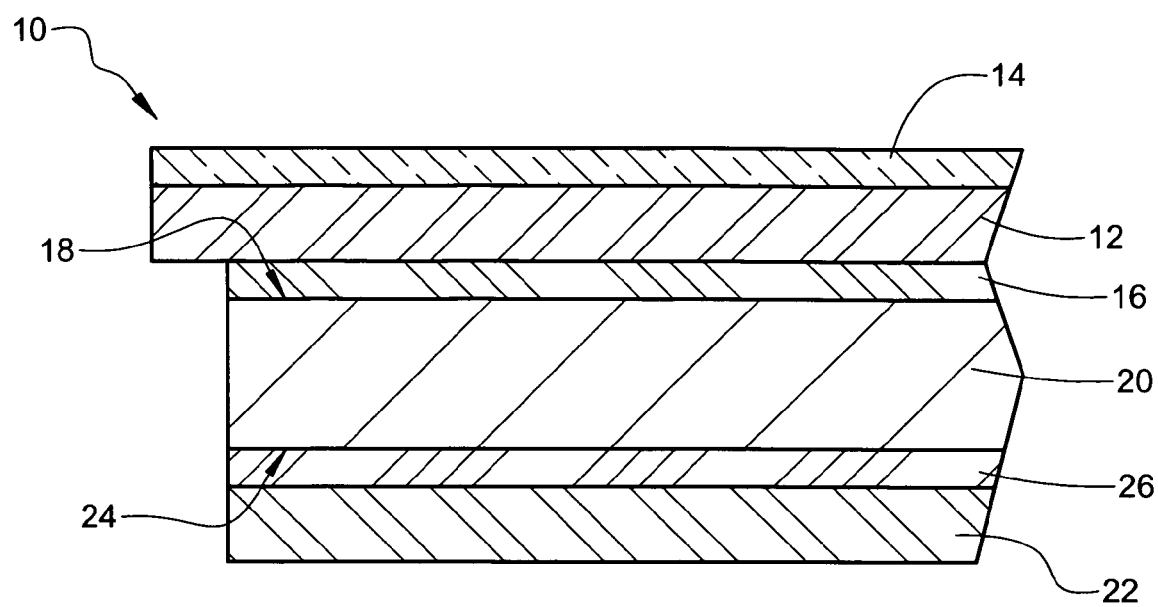
FIG. 1 is a simplified side cross-sectional view of an ink-receptive film that is applied to a card substrate in accordance with methods of the prior art.
Figure 2:
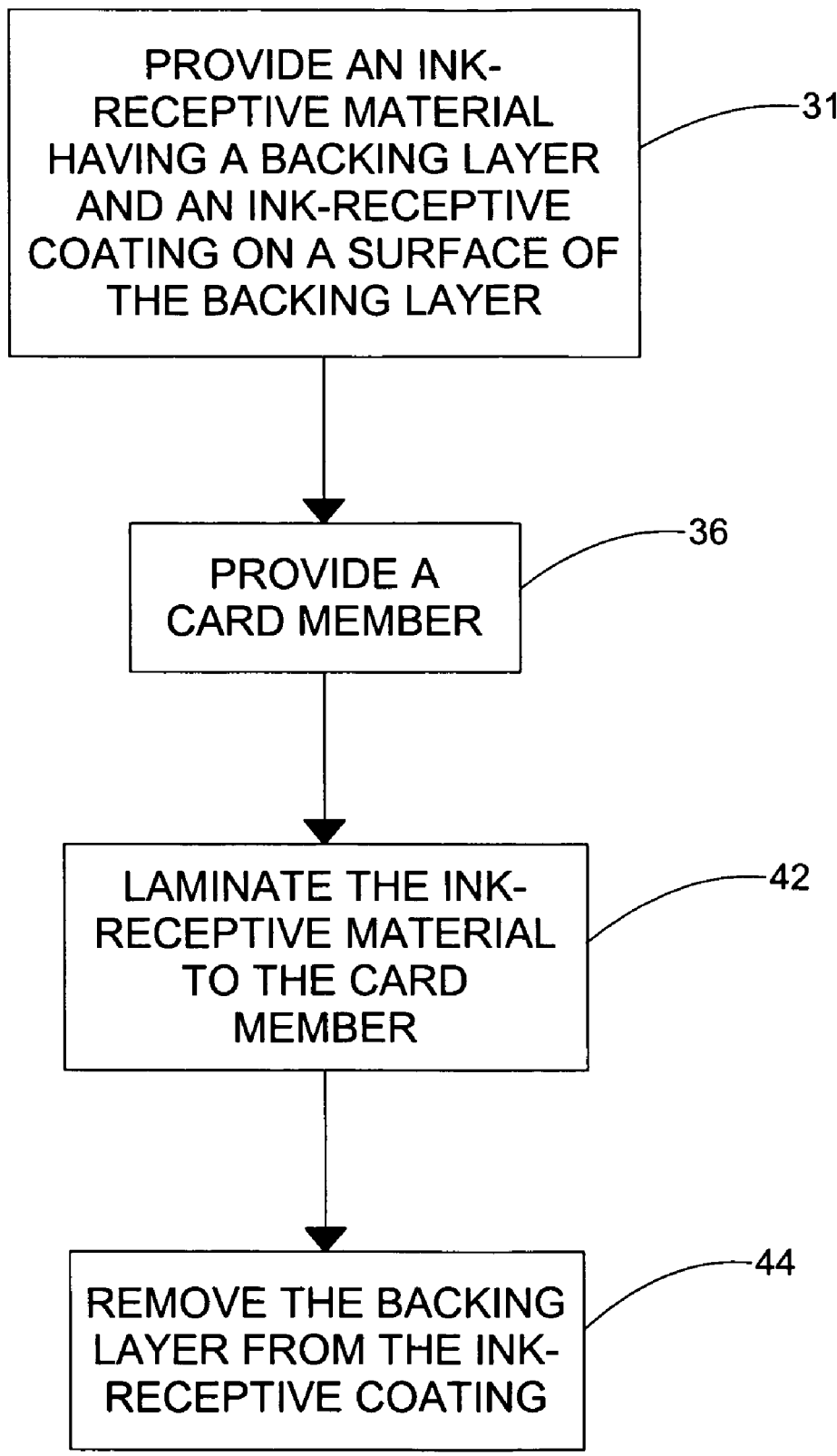
FIG. 2 is a flowchart illustrating a method of forming an ink-receptive card substrate in accordance with embodiments of the invention.
Figure 4:
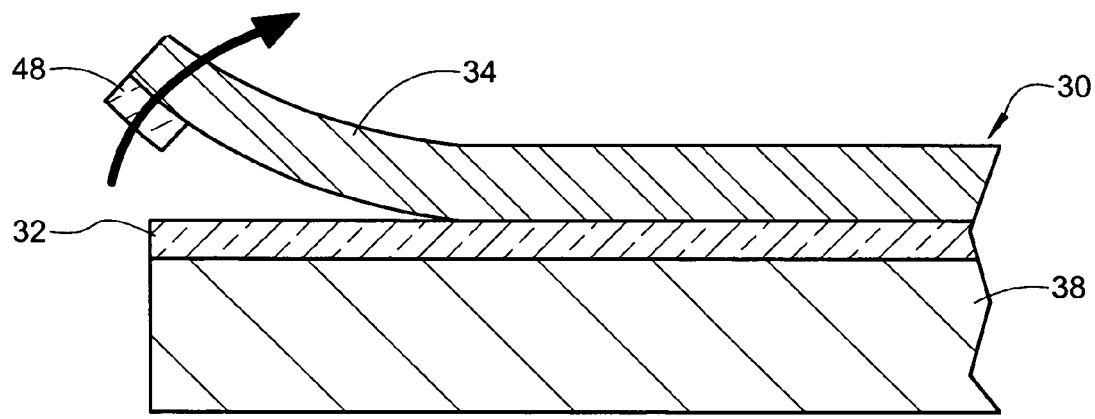
Figure 5:
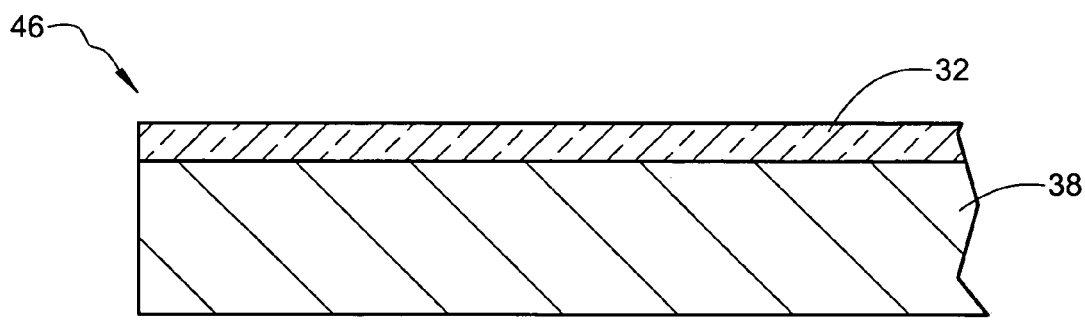

FIG. 2 is a flowchart illustrating a method of forming a card substrate having an ink-receptive surface, in accordance with embodiments of the invention. Various stages of the method are also illustrated in FIGS. 3-5.

Figure 3:
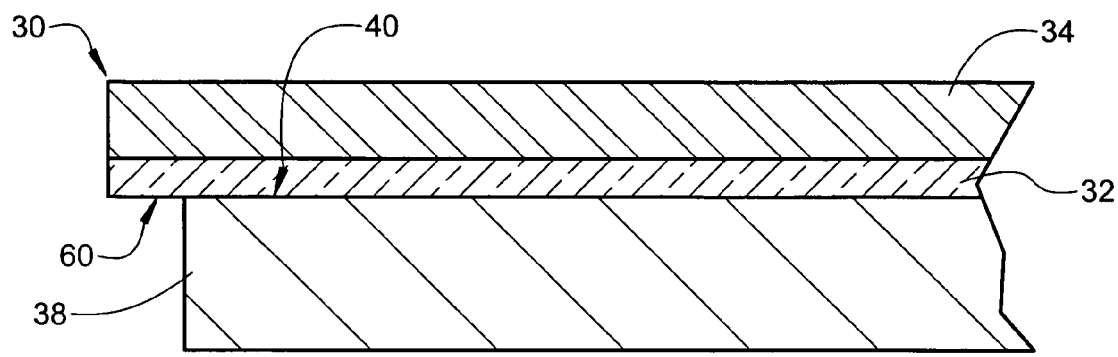
FIGS. 3-5 are simplified side cross-sectional views of various stages of a method of forming an ink-receptive card substrate in accordance with embodiments of the invention.

In the method, an ink-receptive material 30 is provided, as indicated at step 31 of FIG. 2 and shown in FIG. 3. Ink-receptive material 30 includes an ink-receptive coating 32 on a backing layer 34 (e.g., PET).

An ink-receptive material 30 is provided in accordance with an embodiment of the present invention. Ink-receptive material 30 includes an ink-receptive coating 32 on a backing layer 34 (e.g., PET). Ink-receptive coating 32 has a surface 60 and a thickness of approximately 1 mil. Backing layer 34 has a thickness of approximately 4 mils.

Ink-receptive coating 32 generally contains inorganic ceramic materials and organic components. In one embodiment, the ceramic component of ink-receptive coating 32 includes the boehmite form of alumina hydrate ($Al_2O_3$). In some embodiments, ink-receptive coating 32 can be applied to backing layer 34 such that the final dried layer thickness is in the range of 10-50 microns, and preferably in the range of 20-35 microns. In some embodiments, ink-receptive coating 32 can be applied to substrate layer 34 by roll coating, air knife coating, blade coating, rod or bar coating or a variety of other methods. Embodiments of ink-receptive coating 32 include an average pore radius in the range of 5-20 nanometers, with pore volumes in the range of 0.3-1.0 ml/gram.

In one embodiment, the organic portion of coating 32 acts as a binder. It should be noted that the binder can be made of many types of materials. For example, the binder can include a styrene-butadiene copolymer rubber (NBR) latex, carboxymethyl cellulose, hydroxymethyl cellulose or polyvinyl pyrrolidone.

In one embodiment, backing layer 34 can include polymeric films and polyester resin, such as PET, polyester diacetate polycarbonate resins, fluroresisns (i.e. ETFE) and polyvinyl chloride resins, paper sheets and synthetic paper sheets.

Coating 32 can also contain other materials to provide weather resistance, provide improved light and ozone resistance, assist in the stability of dyes and prevent dye fading. For example, additional polymerizable binders can be used to improve weather resistance, additional magnesium (Mg) and/or thiocyanate (SCN) ions can provide improved light and ozone resistance, additional organic materials such as dithiocarbamates, thiurams, thiocyanate esters, thiocyanates and hindered amines help prevent dye fading and additional non-ionic or cationic water insoluble resins particles can improve coating stability.

Other coatings can be added to coating 32. For example, coating 32 can include a silica gel coating that can be applied to improve gloss and abrasion resistance and silica agglomerates can be used to promote receptivity for pigmented inks.

Exemplary ink-receptive materials 30 are produced by Ikonics Corporation of Duluth, Minn., such as AccuArt™ and AccuBlack™, which are generally used for the production of film positives, negatives, color proofs and full-color presentation transparency displays. The ink-receptive coating of AccuArt™ includes many of the desired features and components for ink-receptive material 30. Although the AccuArt™ film is a suitable film for the present invention, those skilled in the art should recognize that other ink-receptive coatings can be applied to backing layer 34.

At step 36 of the method, a card member 38 is provided. Card member 38, shown in the cross-sectional view of FIG. 3, is preferably formed of a rigid or semi-rigid material, such as PVC, which has a surface 40 that is generally unreceptive to ink. Card member 38 can be in the form of an individual card substrate (i.e., standard identification card size). Alternatively, card member 38 can be in the form of a sheet (e.g., 2 ft. by 2 ft.) of card substrate material, from which individual card substrates can be cut, to facilitate mass card substrate production.

Even though it is possible to perform the method of the present invention when ink-receptive material 30 conforms to or is formed smaller than the card member 38, it is desirable to have the ink-receptive material be slightly larger than surface 40 of card member 38 to transform the entire surface 40 into an ink-receptive surface. Thus, it is desirable that ink-receptive material 30 overhang the edges of card member 38, as shown in FIG. 3. Ink-receptive material 30 can be in the form of an individual sheet, a web of individual sheets that are linked together, or an ink-receptive film or web that is carried by supply and take-up rolls, as will be discussed below in greater detail.

Ink-receptive material 30 is laid over card member 38 with the exposed ink-receptive coating 32 facing a surface 40 of card member 38, as shown in FIG. 3. Next, ink-receptive material 30 is laminated to card member 38 under application of heat (approximately 300° F.) and pressure, as indicated at step 42 of the method. This causes ink-receptive coating 32 to bond directly to surface 40 of card member 38. Finally, at step 44, backing layer 34 of ink-receptive material 30 can be removed from ink-receptive coating 32, as shown in FIG. 4. During this step, ink-receptive coating 32 that was bonded to surface 40 of card member 38 during the laminating step 42, remains bonded to surface 40 to thereby form an ink-receptive card member 46 shown in FIG. 5. Surface 40 of card member 38 can be coated with a bonding material to promote adhesion of the ink-receptive coating 32 to surface 40, if necessary. A portion 48 of ink-receptive coating 32 that was not bonded to surface 40 of card member 38 remains attached to backing layer 34, as shown in FIG. 4. As a result, the method of the present invention avoids having to trim backing layer 34.

Ink-receptive card member 46 is ready to receive an image on ink-receptive surface 40 to produce an identification card. Preferably, ink-receptive card member 46 is sized for use in an identification card printer that utilizes an ink jet printhead to print the image to surface 40. Accordingly, when card member 38 is a sheet of card substrate material, ink-receptive card member 46 must be cut into individual card substrates prior to use in an identification card printer. Such cutting of ink-receptive card member 46 can be conducted either prior to the removing step 46 or after. In order to provide protection to ink-receptive surface 40 during transport and handling of ink-receptive card member 46, the removing step 44 should be delayed until just prior to the use of ink-receptive card member 46.

Figure 6:
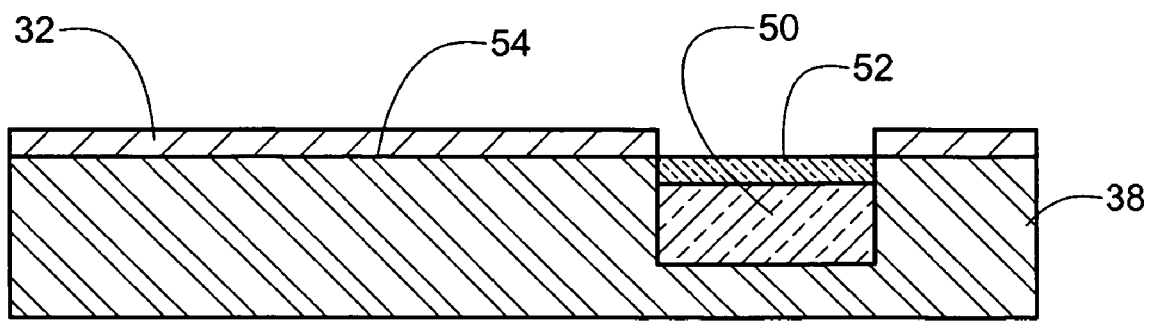
FIG. 6 is a simplified cross-sectional view of a card substrate that includes an embedded chip and an ink-receptive coating that has been applied in accordance with a method of the present invention.

The method of the present invention can also form an ink-receptive coating on smart card substrates or card members 38 that include a micro-module or chip 50 having a contact plate 52, shown in FIG. 6. When applying an ink-receptive coating to a surface 54 of the card member 38 through which contact plate 52 is exposed, it is desirable to avoid covering contact surface 54. Experiments have shown that the ink-receptive coating 32 of ink-receptive material 30 adheres to surface 54 of card member 38 while desirably releasing from contact plate 52 of chip 50 when the backing layer 34 is removed, as shown in FIG. 6. Accordingly, the method of the present invention is effective in applying the ink-receptive coating 32 to such smart card substrates. If the method of the prior art were used, a portion of backing layer 34 that covers the contact plate 52 would have to be removed.

In accordance with another embodiment of the present invention, an image is printed to surface 60 (FIG. 3) of ink-receptive coating 32 of material 30 prior to the laminating step 42 while ink-receptive coating 32 remains adhered to backing layer 34. Preferably, the image is reverse-printed to allow for the proper viewing of alphanumeric symbols through the substantially transparent layer of ink-receptive coating 32 once it is laminated to surface 40 of card member 38. The layer of ink-receptive coating 32 operates to protect the printed image from the environment. Additionally, this embodiment of the invention also provides greater security from alteration. Backing layer 34 can remain attached to ink-receptive coating 32 following the laminating step 42 (removing step 46 not performed) to provide additional protection thereto. Accordingly, it may be necessary to trim portions of backing layer 34 that overhang edges of card member 38 and the ink-receptive coating attached thereto to complete the formation of an identification card. Additionally, ink-receptive material 30 can include an adhesion promoter (e.g., a primer or an adhesive) between backing layer 34 and ink-receptive coating 32 to ensure that backing layer 34 remains attached to ink-receptive coating 32.

Figure 7:
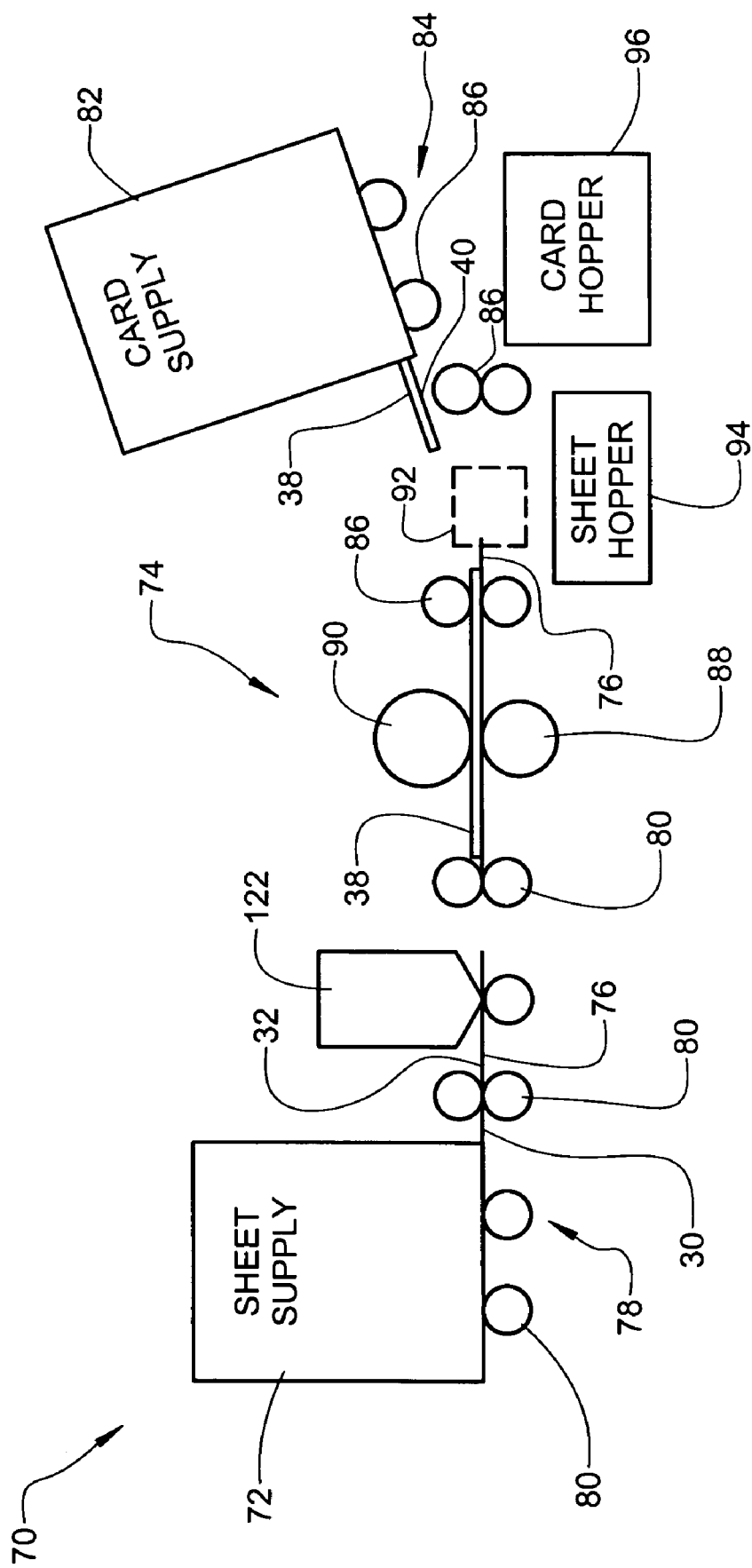
FIG. 7 is a schematic diagram of a device that is configured to form an ink-receptive card substrate in accordance with embodiments of the invention.

A device 70 that is configured to perform the various embodiments of the method of the present invention is schematically shown in FIG. 7. Controllers, electrical connections, sensors, and other conventional components are not shown to simplify the discussion of the invention. Device 70 generally includes a supply 72 of ink-receptive material 30 and a laminating section 74. In accordance with one embodiment of the invention, supply 72 contains a plurality of individual sheets 76 of ink-receptive material 30. A sheet feed mechanism 78 includes a plurality of feed and drive rollers 80 that are configured to transport individual sheets 76 from supply 72 to laminating section 74. Device 70 can also include a card supply 82 that is configured to contain a plurality of card members 38. Individual card members 38 contained in card supply 82 can be fed therefrom to laminating section 74 by a card feed mechanism 84 that includes a plurality of guide and feed rollers 86. Sheets 76 of ink-receptive material 30 are fed to laminating section 74 such that the ink-receptive coating 32 faces the surface 40 of card member 38 that is to be formed into an ink-receptive surface. Accordingly, in the embodiment depicted in FIG. 7, device 70 feeds sheets 76 with ink-receptive coating 32 facing upward while card members 38 are fed with surface 40 facing downward. However, other configurations are possible.

Laminating section 74 receives a card 38 and a sheet 76 with the sheet 76 preferably covering the entire surface 40 of card member 38. Laminating section 74 includes a heated roller 88 and a backup roller 90. Card member 38 and the adjoining sheet 76 are fed between heated roller 88 and backup roller 90. Heated roller 88 applies heat to sheet 76 while card member 38 and sheet 76 are pinched between heated roller 88 and backup roller 90 to laminate ink-receptive sheet 76 to surface 40 of card member 38. This results in the bonding of ink-receptive coating 32 of ink-receptive sheet 76 to surface 40 of card member 38, as discussed above.

Following the lamination of ink-receptive sheet 76 to card member 38, the laminated card member 38 can be discharged and the backing layer 34 of ink-receptive sheet 76 can be removed at a later time. Alternatively, device 70 can include a separator 92 that is configured to remove backing layer 34 of ink-receptive sheet 76 as discussed above to complete the formation of an ink-receptive card substrate 46, as discussed above. The removed backing layers 34 with the portions of ink-receptive coating 32 that were not bonded to card member 38 can be collected in a sheet hopper 94 while the ink-receptive card substrates 46 are discharged to card hopper 96 by card feed mechanism 84.

Figure 8:
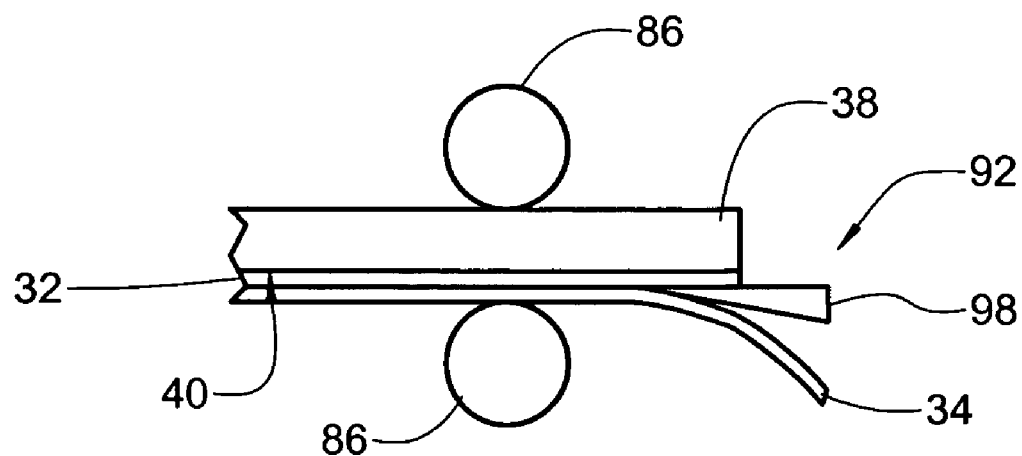
FIGS. 8 and 9 are simplified side and top views of a separator in accordance with embodiments of the invention.
Figure 9:
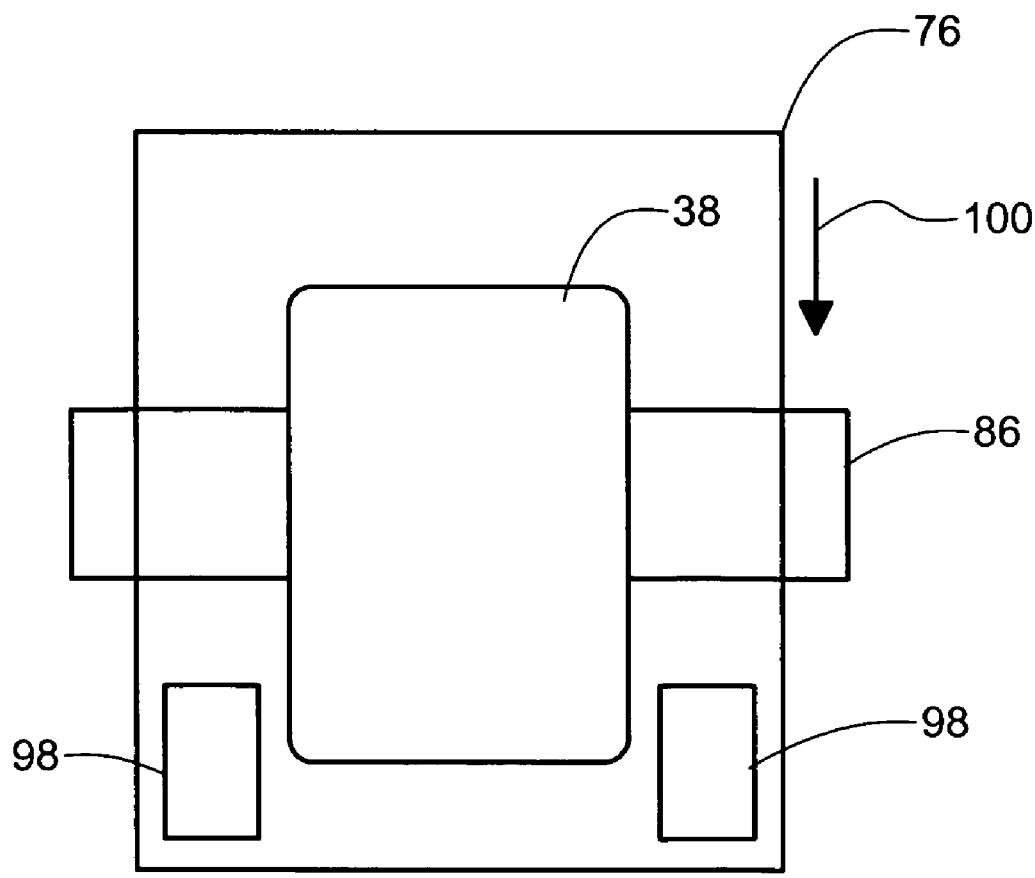
Figure 10:
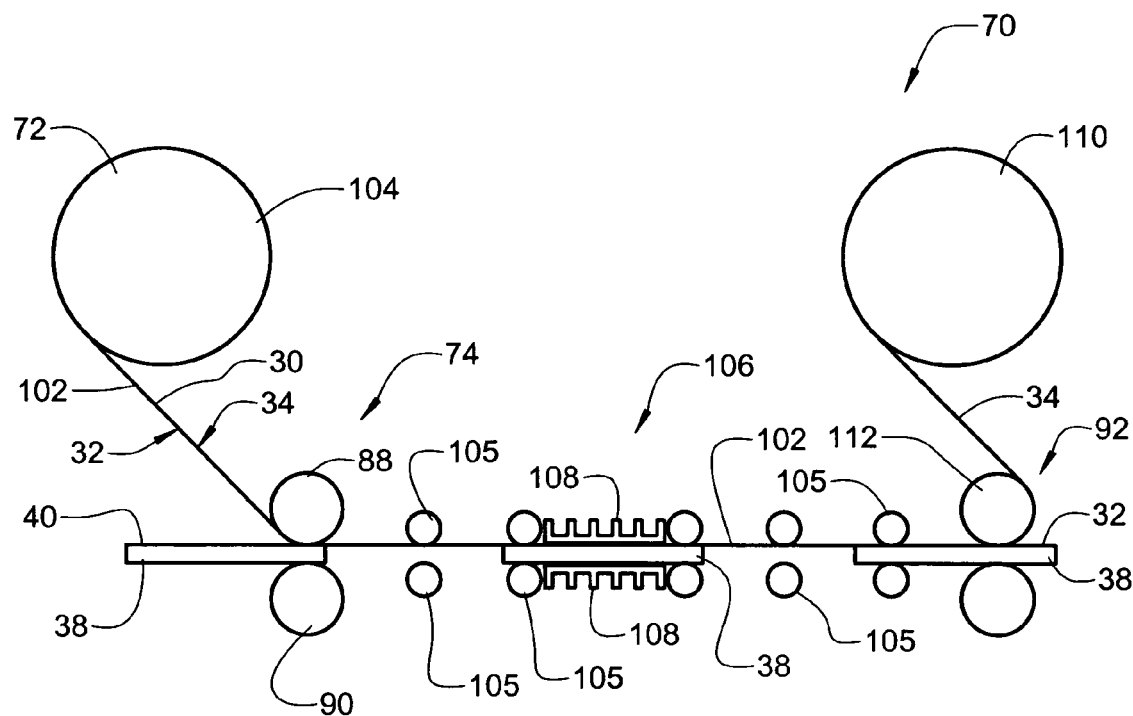
FIG. 10 is a simplified side view of a device that is configured to form an ink-receptive card substrate in accordance with embodiments of the invention.
Figure 11:
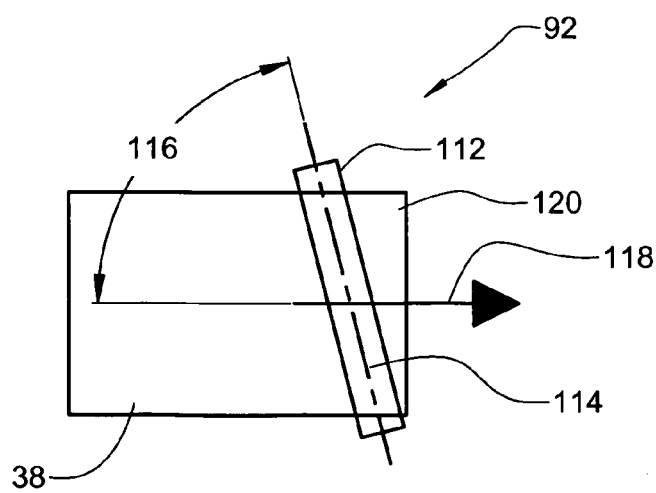
FIG. 11 is a simplified top view of a separator in accordance with embodiments of the invention.

One embodiment of separator 92 includes one or more wedge members 98, as illustrated in the simplified side view of FIG. 8 and the simplified top view of FIG. 9. Wedge members 98 deflect backing layer 34 away from ink-receptive coating 32 and card member 38 as laminated card member 38 is fed in the direction indicated by arrow 100 (FIG. 9) to completely remove backing layer 34 from laminated card member 38 and complete the formation of ink-receptive card substrate 46. The removed backing layer 34 can then be collected in sheet hopper 94 and ink-receptive card substrate 46 can be collected in card hopper 96, which are shown in FIG. 7.

In accordance with another embodiment of the invention, the supply 72 of ink-receptive material 30 is in the form of an ink-receptive film 102 that is wound on a supply roll 104. The ink-receptive coating 32 is positioned below backing layer 34. Ink-receptive film 102 along with a card member 38 are fed to laminating section 74 using conventional drive and feed rollers 105 where they are received between heated roller 88 and backup roller 90. Heated roller 88 applies heat and pressure to ink-receptive film 102 and card member 38 in the manner discussed above to laminate ink-receptive film 102 to card member 38 such that the ink-receptive coating 32 bonds to surface 40 of card member 38. Device 70 can also include a cooling station 106 through which card member 38 and the bonded ink-receptive film 102 is transported. Cooling station 106 can include heat sinks 108 and a fan (not shown) to accelerate cooling of the laminated card member 38.

Device 70 also preferably includes a separator 92 that is configured to peel backing layer 34 of ink-receptive film 102 away from the ink-receptive coating 32 that is bonded to surface 40 of card member 38 and collect backing layer 34 on a take-up roll 110. Separator 92 can include wedge members 98 as discussed above. Alternatively, separator 92 can include a peeling roller 112 that redirects backing layer 34 to take-up roll 110 at an acute angle relative to surface 40 of card member 38. In accordance with one embodiment of the invention, an axis of rotation 114 of peeling roller 112 is oriented at an acute angle 116 relative to a direction of travel of card member 38 that is indicated by arrow 118. This configuration reduces the force required to begin removal of backing layer 34 from card member 38 by initially peeling backing layer 34 at a corner 120 of card member 38.

In accordance with another embodiment of the invention, device 70 includes a printhead 122 that is configured to receive ink-receptive material 30 and print an image on the ink-receptive coating 32, as shown in FIG. 7. Printhead 122 is preferably an ink jet printhead that is operated in accordance with conventional methods. As discussed above, printhead 122 preferably prints a reverse image to ink-receptive coating 32 of ink-receptive material 30 such that alphanumeric symbols are appropriately displayed when viewed through the layer of ink-receptive coating 32 that is bonded to surface 40 of card member 38.

In accordance with another embodiment of the invention, printhead 122 is positioned to print on the ink-receptive coating 32 that is bonded to surface 40 of card substrate 38. For the device 70 depicted in FIG. 7, this requires printhead 122 to generally be flipped in the vertical direction such that it prints upward onto the downwardly facing surface 40 of ink-receptive card member 46. Additionally, printhead 122 is preferably positioned downstream of separator 92.

Although the present invention has been described with reference to preferred embodiments, workers skilled in the art will recognize that changes may be made in form and detail without departing from the spirit and scope of the invention.

What is claimed is:

1. A method of forming an ink-receptive card substrate comprising steps of:
    a) providing an ink-receptive material having a backing layer and an ink-receptive coating in contact with a surface of the backing layer;
    b) providing a card member;
    c) jetting ink with an ink jet printhead on the ink-receptive coating to form an image;
    d) laminating the ink-receptive material to a surface of the card member with a laminator, wherein the ink-receptive coating is bonded to and completely covers the surface of the card member; and
    e) removing the backing layer from the ink-receptive coating with a separator.

2. The method of claim 1, wherein the ink-receptive material overhangs edges of the card member during the laminating step d).

3. The method of claim 1, wherein the removing step e) further includes removing a portion of the ink-receptive coating that is not laminated to the surface of the card member.

4. The method of claim 1, wherein the ink-receptive material is in the form of an individual ink-receptive sheet.

5. The method of claim 1, wherein the ink-receptive material is in the form of an ink-receptive film.

6. The method of claim 5, wherein the ink-receptive material is supported on a supply roll.

7. The method of claim 1, wherein the card member is sized in accordance with standardized identification card substrates.

8. The method of claim 1, wherein the card member is in the form of a sheet of card substrate material.

9. The method of claim 8 including f) cutting an individual card substrate from the sheet of card substrate material.

10. The method of claim 1, wherein the card member includes an embedded chip having exposed contacts.

11. The method of claim 10, wherein the ink-receptive coating does not bond to the exposed contacts during the laminating step d).

12. The method of claim 1, wherein the ink-receptive coating comprises a porous material.

13. A device for forming card substrates comprising:
    a supply of ink-receptive material having a backing layer and an ink-receptive coating on the surface of the backing layer;
    a supply of card substrates;
    an ink jet printhead configured to print an image on the ink-receptive coating;
    a laminator configured to laminate the ink-receptive material to a surface of each card substrate, wherein the ink-receptive coating is bonded to and completely covers the surface of the card member; and
    a separator configured to remove the backing layer from the ink-receptive coating.

14. The device of claim 13, wherein the ink-receptive coating comprises a porous material.

15. The device of claim 14, wherein the porous material of the ink-receptive coating comprises a pore radius of approximately 5 to 20 nanometers.

16. The device of claim 13, wherein the separator is further configured to remove a portion of the ink-receptive coating that is not laminated to the surface of the card substrate.

17. A method of forming an identification card comprising the steps of:
    a) providing an ink-receptive material that includes a backing layer and a porous ink-receptive coating on a surface of the backing layer;
    b) providing a card member;
    c) printing an image on the ink-receptive coating with an ink jet printhead;
    c) laminating the ink-receptive coating to a surface of the card member with a laminator, wherein the surface of the card member is completely laminated with the ink-receptive coating; and
    d) removing the backing layer from the ink-receptive coating and removing a portion of the ink-receptive coating that is not laminated to the card member with a separator.

18. The method of claim 17, further wherein the printing step c) comprises printing on the ink-receptive coating using a jetted ink.

19. The method of claim 17, wherein the ink-receptive coating and backing layer of the ink-receptive material overhangs edges of the card member during the laminating step c).

* * * * *

UNITED STATES PATENT AND TRADEMARK OFFICE
CERTIFICATE OF CORRECTION

| | |
|---|---|
| PATENT NO. | : 7,399,131 B2 |
| APPLICATION NO. | : 11/293966 |
| DATED | : July 15, 2008 |
| INVENTOR(S) | : Gary M. Klinefelter et al. |

It is certified that error appears in the above-identified patent and that said Letters Patent is hereby corrected as shown below:

Page 3, col. 2 line 42, reference 6,270,072 B1 8/2001 Louie ... 270/157, change "270" to --271--.

Page 4, col. 1 line 21, reference 2002/0012773 A1 1/2002 Vaidyz et al. ... 428/195, change "Vaidyz" to --Vaidya--.

Signed and Sealed this

Twenty-third Day of December, 2008

JON W. DUDAS
*Director of the United States Patent and Trademark Office*